United States Patent

Shimizu

[15] 3,700,936

[45] Oct. 24, 1972

[54] HIGH VOLTAGE GENERATING APPARATUS

[72] Inventor: Massao Shimizu, Tokyo, Japan

[73] Assignee: Denki Onkyo Company, Limited, Tokyo, Japan

[22] Filed: Sept. 25, 1970

[21] Appl. No.: 75,407

[30] Foreign Application Priority Data

Sept. 30, 1969 Japan ......................44/92794

[52] U.S. Cl. ......................310/8.1, 310/8.2, 310/9.8

[51] Int. Cl. ..............................................H01v 7/00

[58] Field of Search...........310/8.1, 8.2, 8.3, 8.7, 9.5, 310/9.6, 9.7, 9.8

[56] References Cited

UNITED STATES PATENTS

| | | | |
|---|---|---|---|
| 2,975,354 | 3/1961 | Rosen | 310/8.1 X |
| 3,047,823 | 7/1962 | Ranky | 310/9.8 X |
| 3,518,573 | 6/1970 | Smith | 310/9.8 X |

*Primary Examiner*—J. V. Truhe
*Assistant Examiner*—B. A. Reynolds
*Attorney*—Chittick, Pfund, Birch, Samuels & Gauthier

[57] ABSTRACT

In a high voltage generating apparatus utilizing a piezoelectric transformer element driven by an AC voltage, the resonance frequency of the piezoelectric transducer element is varied by connecting a variable capacitor of small capacity between the output electrode of the piezoelectric transformer element and the ground.

2 Claims, 2 Drawing Figures

INVENTOR

MASAO SHIMIZU

BY Chittick, Pfund, Birch Samuels & Gauthier
ATTORNEY

HIGH VOLTAGE GENERATING APPARATUS

BACKGROUND OF THE INVENTION

This invention relates to high voltage generating apparatus, and more particularly to improved high voltage generating apparatus utilizing piezoelectric transformer elements.

Generally, a piezoelectric transformer element comprises a ceramic substrate of piezoelectric substance, a pair of driving electrodes applied on the opposite surfaces of one end of the substrate, and an output electrode applied to the end surface of the opposite end. An AC driving voltage is applied across the driving electrodes to produce a high voltage at the output electrode having a frequency equal to the natural frequency of the mechanical vibration of the substrate. Usually, as the driving voltage, is utilized a sinusoidal wave or a pulse wave having a frequency substantially equal to the resonance frequency of the piezoelectric transformer element.

It is desirable to produce a number of piezoelectric transformer elements having exactly the same dimensions and characteristics but owing to manufacturing errors, the natural frequencies or the operating frequencies of respective elements differ a little.

It is known that the voltage regulation of the piezoelectric transformer elements can be improved when the frequency of the driving voltage supplied to the elements is shifted from the most suitable operating frequency by a predetermined frequency, for example about 200 to 500 Hz.

For this reason, it is desired to bring the resonance frequency of the piezoelectric element close to the most suitable operating frequency.

According to the prior practice, the resonance frequency of the substrate has been adjusted by grinding one end of the substrate. This method of adjustment, however, required a relatively long time yet the accuracy is not so high.

SUMMARY OF THE INVENTION

It is an object of this invention to provide a high voltage generating apparatus utilizing a piezoelectric transformer element wherein the resonance frequency of the element is adjusted close to the most suitable operating frequency.

Another object of this invention is to provide a novel high voltage generating apparatus utilizing a piezoelectric transformer element wherein only the resonance frequency of the piezoelectric transformer element can be varied without varying the output voltage and the voltage regulation characteristics.

Further object of this invention is to provide an improved piezoelectric high voltage generating apparatus capable of readily adjusting the resonance frequency of the piezoelectric transformer element.

According to this invention in a high voltage generating apparatus utilizing a piezoelectric transformer, a variable capacitor of small capacity is connected between the output electrode of the piezoelectric transformer element and the ground whereby resonance frequency can be varied by varying the variable capacitor.

DESCRIPTION OF THE PREFERRED EMBODIMENT

Figure 1:
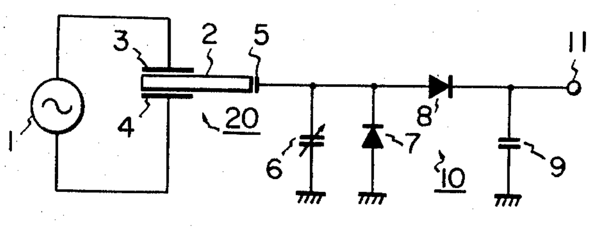
FIG. 1 is a connection diagram of a high voltage generating apparatus embodying the invention and FIG. 2 is a graph showing the relationship between the capacitance of the variable capacitor and the deviation or shift of the resonance frequency of the piezoelectric transducer element.

As shown in FIG. 1, the piezoelectric transformer 20 comprises a pair of driving electrodes 3 and 4 applied on one end of a substrate 2 of fired piezoelectric substance and an output electrode 5 applied on the opposite end surface of the substrate. An AC driving voltage is impressed across the driving electrodes 3 and 4 from a driving source 1. According to this invention, a variable capacitor 6 of small capacity is connected between the output electrode 5 and the ground. A voltage step-up rectifier circuit 10 comprising diodes 7 and 8 and a smoothing capacitor 9 is connected between the output electrode 5 and a DC output terminal 11.

The resonance frequency of the piezoelectric transformer element 20 is readily varied by varying the variable capacitor 6. The deviation $\Delta f$ of the resonance frequency is expressed by the following equation $$\Delta f = fo - fx$$

where $fo$ represents the resonance frequency of the piezoelectric transformer element 20 where the variable capacitor 6 is not used and $fx$ represents the resonance frequency when the variable capacitor is used.

Figure 2:
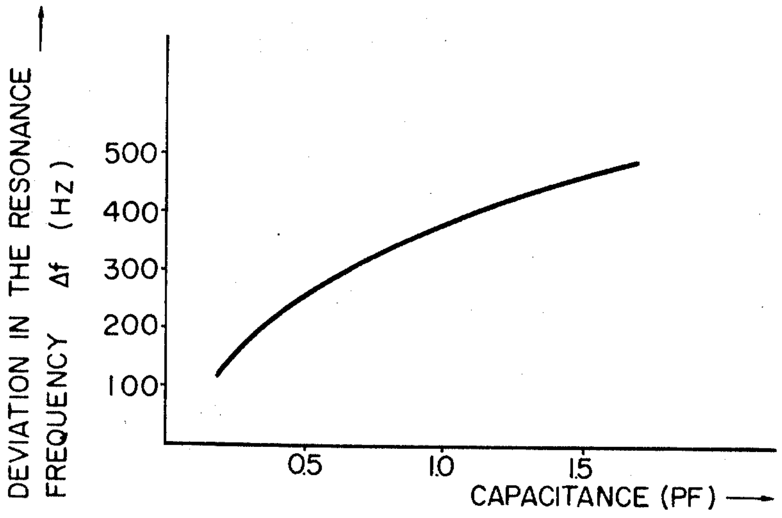

FIG. 2 shows the relationship between the frequency deviation $\Delta f$ and the capacitance of the variable capacitor 6. This graph shows that a variable capacitor of only few picofarads is sufficient to produce a frequency shift of about 500Hz. Thus, a capacitor which is variable over a range of only a few picofarads, and which therefore extends a little beyond the range of capacitance shown in Fig. 2, is able to provide a range of frequency shift of about 200–500Hz which is desired as noted above. The beginning of the capacitance-frequency change curve in FIG. 2 illustrates that a capacitance the value of about 0.2 picofarads for the capacitor 6 provides a frequency change of a little over 100Hz. Interpreting with the curve, a frequency change of about 100Hz is obtained with a value of 0.1–0.2 picofarads. At the other end of the curve, the value of 600Hz (100Hz plus the desired frequency shift of 500Hz) would be obtained, based on extrapolation of the curve, with a capacitor of about 2.5–3.0 picofarads. Thus, a frequency deviation of 500Hz would be obtained with a variable capacitor of about 0.1 to 3.0 picofarads. When the capacitance of the capacitor to be connected is known, a fixed capacitor may be substituted for the variable capacitor.

What is claimed is:

1. A high voltage generating apparatus comprising a piezoelectric transformer element including a substrate of piezoelectric substance, a pair of driving electrodes applied on the opposite surfaces of one end of said substrate, an output electrode applied to the opposite end surface of said substrate, a driving source for applying an AC driving voltage across said driving electrodes, and a capacitor connected between said output electrode and ground, said capacitor having a capacitance in the range of from approximately 0.1 to approximately 3 picofarads.

2. The high voltage generating apparatus as recited in claim 1 wherein said capacitor is a variable capacitor adapted to vary within said range.

* * * * *

UNITED STATES PATENT OFFICE

CERTIFICATE OF CORRECTION

Patent No. 3,700,936 Dated October 24, 1972

Inventor(s) Masao Shimizu

It is certified that error appears in the above-identified patent and that said Letters Patent are hereby corrected as shown below:

The inventor's name "Massao Shimizu" should be

--Masao Shimizu--.

Signed and sealed this 10th day of July 1973.

(SEAL)
Attest:

EDWARD M.FLETCHER,JR.
Attesting Officer

Rene Tegtmeyer
Acting Commissioner of Patents